J. W. Wood,

Bee Hive.

No. 109,702.  Patented Nov. 29, 1870.

Witnesses:  Inventor:
  J. W. Wood
  PER
  Attorneys.

United States Patent Office.

JAMES W. WOOD, OF ALDEN, ILLINOIS.

Letters Patent No. 109,702, dated November 29, 1870.

IMPROVEMENT IN BEE-HOUSES.

The Schedule referred to in these Letters Patent and making part of the same.

To all whom it may concern:

Be it known that I, JAMES W. WOOD, of Alden, in the county of McHenry and State of Illinois, have invented new and useful Improvements in Bee-Houses; and I do hereby declare that the following is a full, clear, and exact description thereof, which will enable others skilled in the art to make and use the same, reference being had to the accompanying drawing forming part of this specification.

My invention relates to bee-houses, and consists in an improved construction thereof, whereby the hives are protected from depredation and yet rendered easily accessible to the bees, all as hereinafter more particularly specified.

Similar letters of reference indicate corresponding parts.

Figure 1:
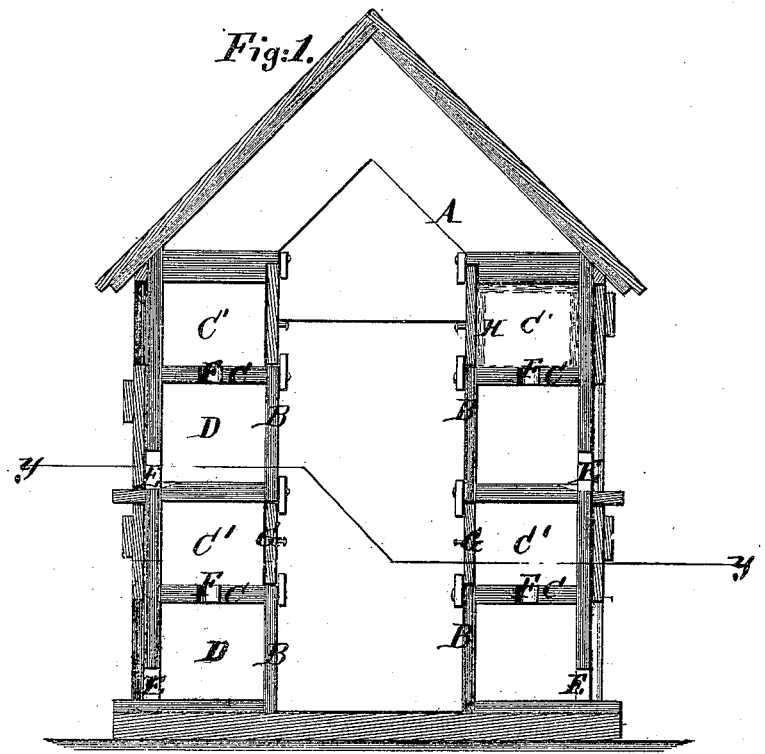
Figure 1 is a sectional elevation of my improved bee-house.
Figure 2:
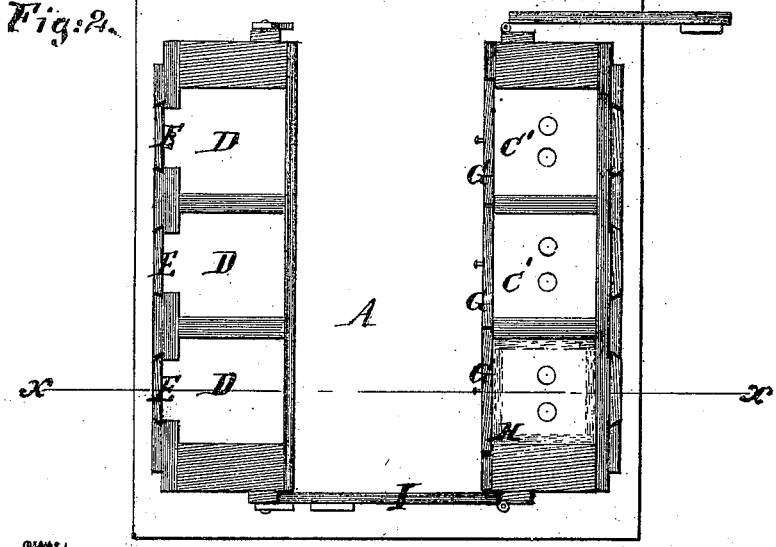
Figure 2 is a horizontal section of the same.

A represents a small rectangular house, of the proper size for containing the hives B in two rows, one on each side, two or more tiers high, as shown.

These hives are boxes having divisions C, making lower compartments D and upper ones c'. The lower ones have passages E leading to them, through the side of the house, and there are passages F from the lower compartments to the upper ones.

The inner vertical sides G of the upper compartments are made removable, for the purpose of introducing honey-boxes H into the upper compartments for the bees to deposit their honey in, and to be withdrawn for removing the honey when the bees are in the space below.

After these boxes are withdrawn the holes F may be plugged, and the bees confined to the space below.

Two honey-boxes may be placed in the compartment if preferred.

The bees may be introduced to these hives, from a table or other hive, through the door I of the house and the doors G, after which the latter are closed and the outside passage E opened.

The only means of access to the honey-boxes being through the door I, it is safely secured against robbery by properly securing the door. The hives being opened to allow the bees access to the space in the house between the hives will prevent the bees from swarming.

Having thus described my invention,

I claim as new and desire to secure by Letters Patent—

The arrangement of the bee-house A, secured by a locked door, I, and having a central passage between inwardly-removable hives, said hives being accessible only to bees from the outside by means of apertures E, substantially as described.

JAMES W. WOOD.

Witnesses:
   GEO. B. ANDREWS,
   C. N. GILES.